United States Patent
McGee et al.

(10) Patent No.: US 7,693,045 B2
(45) Date of Patent: Apr. 6, 2010

(54) VERIFYING NETWORK CONNECTIVITY

(75) Inventors: Michael Sean McGee, Round Rock, TX (US); Mark Christopher Stratton, Georgetown, TX (US); Darda Chang, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 889 days.

(21) Appl. No.: 11/315,812

(22) Filed: Dec. 22, 2005

(65) Prior Publication Data

US 2006/0143309 A1 Jun. 29, 2006

Related U.S. Application Data

(60) Provisional application No. 60/639,921, filed on Dec. 29, 2004.

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)
H04L 12/28 (2006.01)
H04L 12/50 (2006.01)
H04L 12/56 (2006.01)

(52) U.S. Cl. .............. 370/216; 370/217; 370/218; 370/225; 370/226; 370/227; 370/228; 370/241; 370/241.1; 370/242; 370/244; 370/245; 370/248; 370/250

(58) Field of Classification Search .............. 370/218
See application file for complete search history.

(56) References Cited

U.S. PATENT DOCUMENTS

| 7,097,537 | B1 * | 8/2006 | David et al. ............... 451/5 |
| 2004/0085894 | A1 * | 5/2004 | Wang et al. ............... 370/216 |
| 2006/0083254 | A1 * | 4/2006 | Ge et al. ............... 370/401 |

OTHER PUBLICATIONS

Thomas Davis, Apr. 5, 2004, Linux Ethernet Bonding Driver HOWTO, pp. 1-17.*
David Plummer, Nov. 1982, Request for Comments 826, pp. 1-11.*
(Thomas Davis, Apr. 5, 2004, Linux Ethernet Bonding Driver HOWTO, pp. 1-17.*
Michael Sean McGee et al., "Method And System For Monitoring Network Connectivity," U.S. Appl. No. 10/898,399, filed Jul. 23, 2004, 28 pp.

* cited by examiner

*Primary Examiner*—Daniel J Ryman
*Assistant Examiner*—Christopher Crutchfield

(57) ABSTRACT

A system comprising a computer including a plurality of network interface controllers (NICs), the plurality of NICs associated with an address. The system further comprises a switching apparatus coupled to the computer and an echo device coupled to the switching apparatus. The echo device is adapted to send a packet to the switching apparatus to verify connectivity with the plurality of NICs. The packet comprises the address. The switching apparatus compares the address with a data structure to locate a matching address. If no matching address is located, the switching apparatus sends copies of the packet to each of the plurality of NICs coupled to the switching apparatus.

8 Claims, 8 Drawing Sheets

VERIFYING NETWORK CONNECTIVITY

CROSS-REFERENCE TO A RELATED APPLICATION

The present application claims the benefit of, and incorporates by reference, provisional application Ser. No. 60/639,921, filed Dec. 29, 2004, and entitled "Method for Using Frame Flooding Mechanism to Validate Layer 2 Connectivity from Single Node to Many Nodes."

BACKGROUND

Servers typically couple to computer networks via one or more network interface controllers (NICS) which facilitate communication with devices on the network by wire and/or wireless media. Connectivity failures on the network may cause some devices to retain connectivity to one or more NICs, while other devices may lose such connectivity. Thus, it is desirable to verify connectivity between a network device and one or more NICs. However, some verification techniques may be inefficient.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
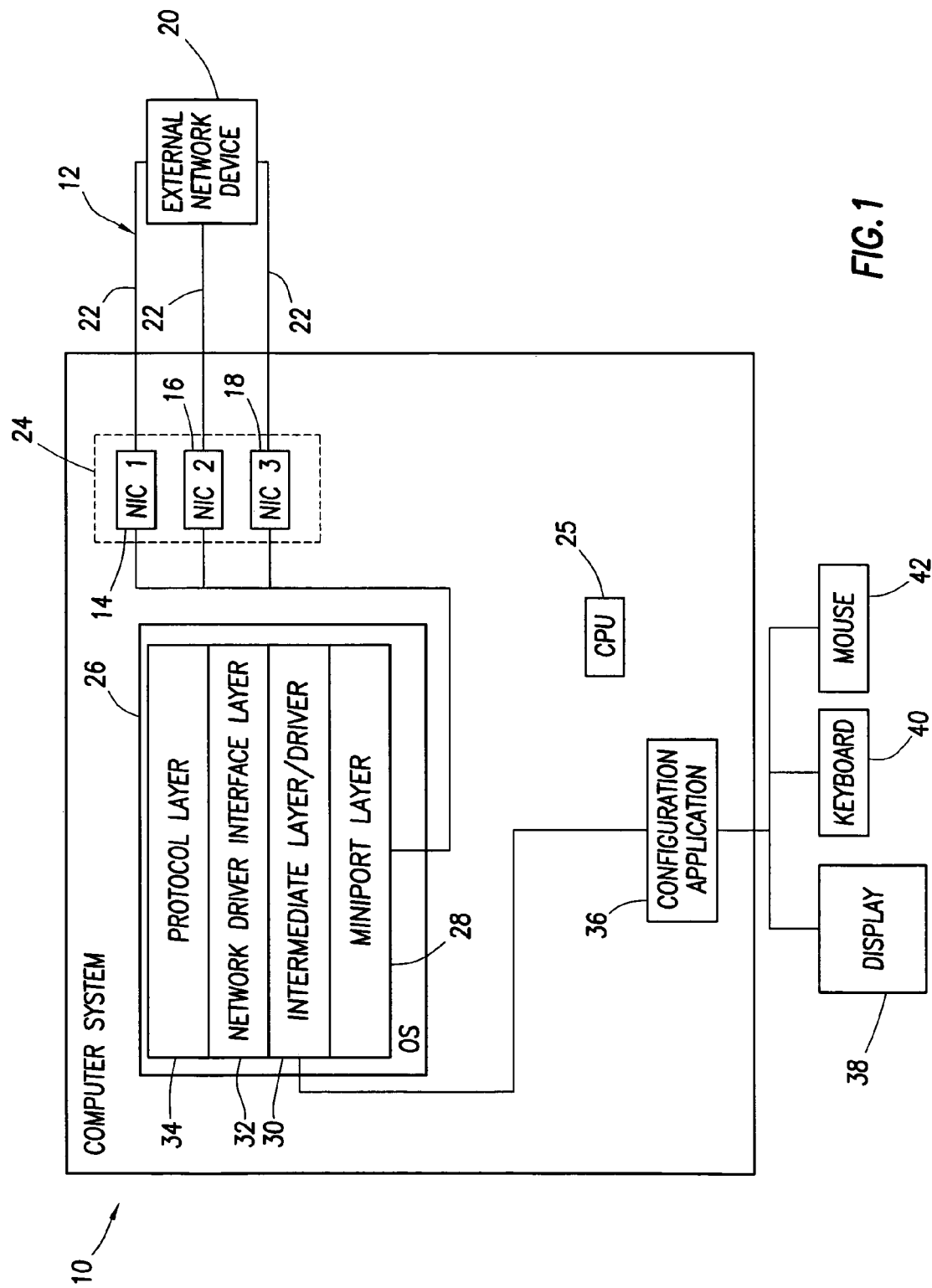
FIG. 1 shows a block diagram of a computer system comprising a NIC team, in accordance with embodiments of the invention.

FIG. 1 illustrates a block diagram of an exemplary computer system 10 which may be used to implement various aspects of the present technique on a computer network. In particular, the exemplary computer system 10 may be a server configured to provide access to network resources to clients of a network 12. The computer system 10 may be equipped with more than one network interface controller (NIC), with each NIC typically being inserted as a card in an expansion slot, such as a Peripheral Component Interconnect (PCI) slot, of the system motherboard. A NIC may couple to the network 12 via a wire or wireless medium. For purposes of illustration, the computer system 10 is shown as being equipped with three such NICs, NIC 14, NIC 16, and NIC 18, each of which provides a connection to the network 12.

Each NIC enables the computer system 10 to communicate with other devices on the network 12, such as with the external network device 20. When two or more NICs couple to a common network 12, as shown in FIG. 1, each NIC provides a separate and redundant link 22 to the network 12, which may be exploited to provide fault tolerance and/or load balancing. For example, for load balancing implementations, the computer system 10 may distribute data among the links 22 to the network 12 according to one or more desired criteria to achieve data throughput consistent with the criteria. Load balancing implementations may include, for example, transmit load balancing or switch-assisted load balancing.

To facilitate these fault tolerance and/or load balancing implementations, the NICs 14, 16, and 18 may be operated as a NIC team 24. The NIC team 24 operates like a single virtual or logical device, i.e., as a single NIC, which is known on the network by a single protocol address, such as an Internet Protocol (IP) address, and by a single media access control (MAC) address. Packets directed to the NIC team addresses are routed to a designated NIC of the NIC team 24, typically known as the primary NIC. Conversely, non-primary NICs, known as secondary NICs, typically do not have IP addresses, so that packets are not routed to them. However, the secondary NICs do have associated MAC addresses for transmitting data. The formation and operation of the NIC team 24 may be accomplished by inclusion of a suitable layer or driver within the operating system (OS) 26 running on the computer system 10. The included layer or driver then may function as an intermediary, translating commands or instructions typically addressed to a single NIC so that the commands or instructions are instead executed by one or more members of the NIC team 24.

For example, the OS 26 may be a network OS, such as Microsoft Windows NT, Windows 2003, or Novell Netware, installed on a server. Such an OS 26 typically includes code supporting the use of one or more communication protocols, such as TCP/IP, IPX, NetBEUI, etc., which may be used to communicate with other devices and/or OSs on the network. This support may be implemented in the OS 26 via a hierarchy of communication or protocol layers, in which each layer typically facilitates communication with the adjacent layers. For example, these layers may include a miniport layer 28 upon which network adapter drivers, i.e., NIC drivers, reside. As will be appreciated by those of ordinary skill in the art, the NIC drivers control the hardware associated with the individual NICs 14, 16, and 18.

In implementations employing NIC teaming, an intermediate layer or driver 30, such as a teaming driver, also may be present. Unlike the NIC drivers of the miniport layer 28, the intermediate driver 30 does not directly control a piece of hardware. Instead, the intermediate driver 30 provides special functionality in a layer between the miniport layer 28 and the protocol layer of the OS 26. For example, to support NIC teaming, the intermediate driver 30 may coordinate the function and communications of the NIC drivers of the miniport layer 28 so that they appear as a single virtual NIC to higher layers of the OS 26. By means of the intermediate driver 30, commands or communication to this virtual NIC may be parsed by the intermediate driver 30 and sent to a particular NIC 14, 16 or 18 of the NIC team 24 via the appropriate NIC driver. The intermediate driver 30 may also provide special functionality for determining the connectivity status of members of NIC team 24 by causing the transmission of one or more types of status requests and receipts, e.g., heartbeats, as described in detail below.

The intermediate driver 30 also may communicate with a network driver interface layer 32, such as an implementation of Microsoft's network driver interface specification (NDIS). The network driver interface layer 32 typically handles communication between the underlying layer, i.e., the intermediate driver 30, and the protocol layer 34. The protocol layer 34 may, among other functions, provide IP or IPX addresses for outbound network traffic. In addition, for networks adhering to the open system interconnection (OSI) model, the protocol layer 34 translates layer 3 addresses (protocol addresses such as IP or IPX addresses) to layer 2 addresses (hardware addresses such as MAC addresses) to insure that data packets are directed to the appropriate network hardware. For example, in an OSI network employing an IP protocol, the protocol layer 34 translates IP addresses to which data packets are addressed to the appropriate media access control (MAC) addresses, e.g., hardware addresses, such that data is routed to the desired network device in a suitable packet format. A communication or protocol stack, as described above, allows communication between applications running on the computer system 10 and other network devices via the NIC team 24.

In addition, the computer system 10 may include a configuration application 36 that enables an operator to interface with the intermediate driver 30. In particular, the operator may interface with the configuration application via an output device, such as a display 38, and one or more input devices, such as a keyboard 40 and/or mouse 42. An operator may use the configuration application 36 to assign NICs to the NIC team 24 and/or to designate a mode of operation for the NIC team 24, such as a fault tolerant mode or a load balancing mode. The system 10 includes a central processing unit (CPU) 25 on which the various software entities described herein execute.

Figure 2:
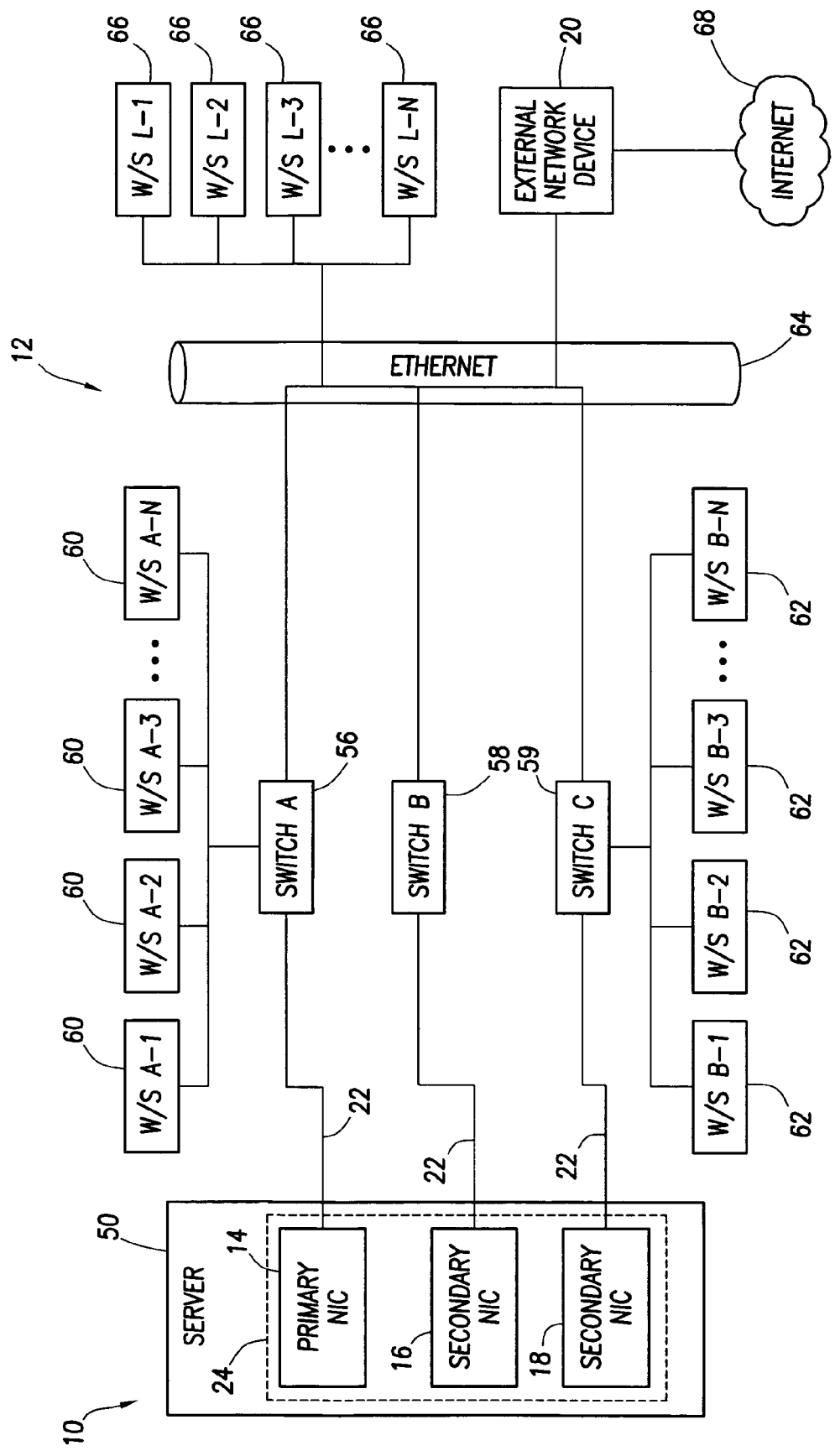
FIG. 2 shows a block diagram of an illustrative computer network, in accordance with an embodiment of the invention.

Referring now to FIG. 2, an exemplary network 12 incorporating an exemplary computer system 10, shown herein as a server 50, is provided. The server 12 may include a NIC team 24 in which one NIC 14 may be designated as the primary NIC while the remainder of the NICs 16 and 18 are designated as secondary NICs. As noted above, the NIC team 24 functions as a single virtual NIC in which communication from the network 12 may primarily be routed through the primary NIC 14. Depending on the NIC team mode, the secondary NICs 16 and 18 may be inactive relative to the primary NIC 14. For example, in a fault tolerant mode, the secondary NICs 16 and 18 are idle and only transmit and receive heartbeats, as described below. The primary NIC 14, however, may transmit and receive other network traffic as well as heartbeats. Alternatively, in a transmission load-balancing mode, the secondary NICs 16 and 18 may transmit load balanced network traffic but do not receive any data traffic as such traffic is routed to the NIC team IP address, and thereby to the primary NIC.

Typically the primary NIC 14 and secondary NICs 16 and 18 couple to the network via respective links 22, such as wire or wireless connections, to respective switch 56, switch 58 and switch 59. As shown, switch 56 and switch 59 may couple to respective sets of workstations 60 and 62, as well as to other network media, such as to the Ethernet backbone 64. In this manner, the various clients, servers, and other network devices of the network 12 may couple via a wired or wireless media, allowing communication between clients and servers and the sharing of network resources.

The connectivity of the members of the NIC team 24 to the network 12 may be monitored using layer 2 heartbeats that are transmitted to and received by the members of the network team 24. Typically, the layer 2 heartbeat frames include only a MAC address, e.g., the hardware address of another NIC of the NIC team 24, and no IP or IPX address, hence the designation as a layer 2 heartbeat. Transmission and reception of the layer 2 heartbeat frames are indicative of a network connection existing between the respective NIC team members. Conversely, the inability to transmit or receive heartbeat frames between two NIC team members indicates the absence of a network connection between the two NIC team members.

Figure 3:
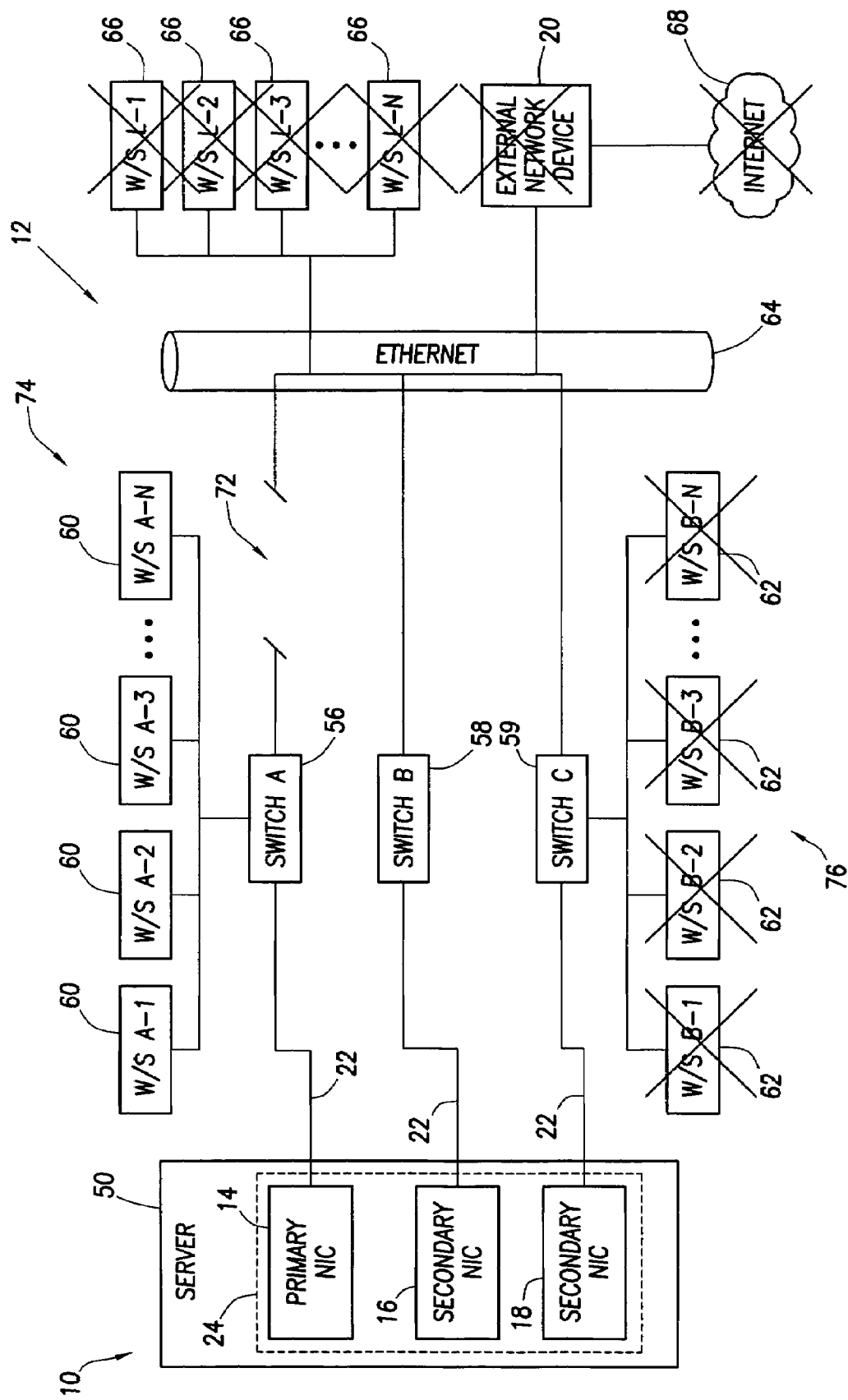
FIG. 3 shows a block diagram of the illustrative computer network of FIG. 2 undergoing a connection disruption, in accordance with an embodiment of the invention.

As may be appreciated from this description of the network 12 and NIC team 24, a failure scenario may occur if there is a break in connectivity on the network 12 between the NICs, such as due to a physical line break, disruption of a wireless signal, or misconfiguration of a setting on a network device, such as switch 56, switch 58, or switch 59. In such a failure scenario, as shown in FIG. 3, the primary NIC 14 and one or more of the secondary NICs 16 and 18 may end up on separate layer 2 networks, herein described as distinct network segments. In such a failure scenario, the layer 2 heartbeats discussed above would not cross between network segments, resulting in an indication that respective members of the NIC team 24 were no longer connected. The distinct network segments thereby created, therefore, would not all remain active.

For example, the connectivity break 72 may effectively create an active network segment 74 coupled to the NIC team 24 via the designated primary NIC 14. However, one or more inactive network segments 76 may also be created that are unable to communicate with the NIC team 24 because they are coupled through one or more secondary NICs 16 and 18 that are isolated from the primary NIC 14 by the connectivity break 72. In such a scenario, connectivity to the server 50 may be lost for those clients coupled to the inactive network segment 76. Based on where the connectivity break 72 occurs, the clients retaining connectivity with the server 50, i.e., the clients on the active network segment 74, may not be the majority of clients on the network 12 or may not represent the most important connections, such as external connections to the internet 68.

Existing techniques utilizing layer 2 heartbeats are not useful in addressing such undesirable network configurations because the layer 2 heartbeats only provide information about the connectivity of NIC team members with one another, i.e., connected or disconnected. In at least some cases, the layer 2 heartbeats may not provide information about where a connectivity break 72 may have occurred, what network devices are still accessible via a particular NIC team member, or which network segment should retain connectivity to the server 50.

One technique for addressing this incongruity is to provide an external network device 20, e.g., an echo node, on the network 12 which may be used to define the most desirable network segment in the event of a connectivity break 72. The presence of the external network device 20 on a network segment may be used to designate that network segment as one that should retain connectivity to the server 50 in preference to other network segments. One way in which connectivity between the external network device 20 and the server 50 may be maintained is to utilize layer 3 heartbeats, i.e., heartbeat frames that test the connectivity between each member of the NIC team 24 and the external network device 20, such as a router running TCP/IP. Such layer 3 heartbeat frames typically include not only a MAC address but also a protocol address, such as an IP or IPX address, for the external network device 20.

Figure 4:
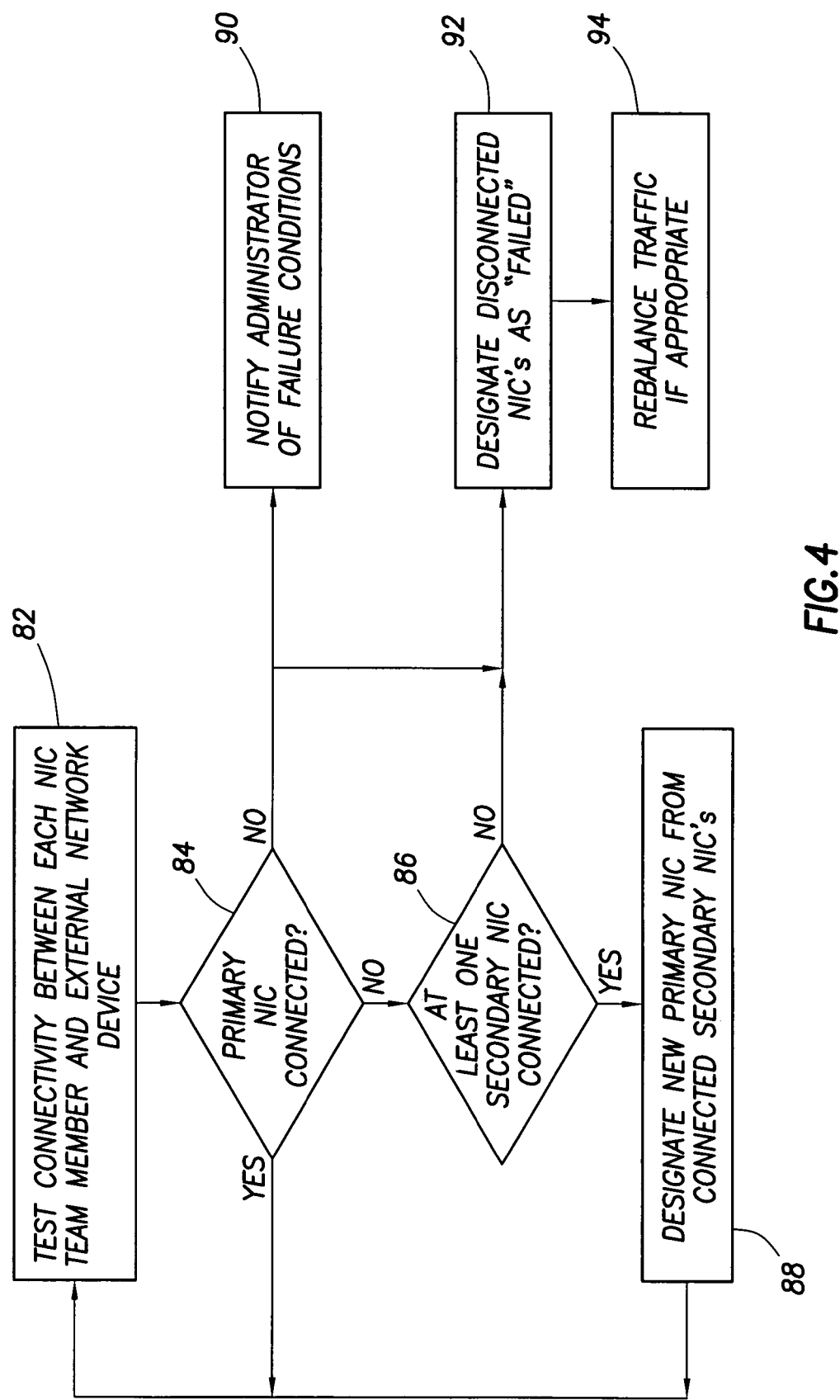
FIG. 4 illustrates a flow diagram of a technique for connection monitoring and recovery, in accordance with an embodiment of the invention.

One example of this technique is described in FIG. 4. As shown at block 82, the connectivity between each member of the NIC team 24 and the external network device 20 is tested. If the primary NIC 14 retains connectivity to the external network device 20, as determined at decision block 84, no action is taken and the connectivity tests may be repeated at a designated interval.

If, however, the primary NIC 14 loses connectivity to the external network device 20, a determination may then be made whether one or more of the secondary NICs 16 and 18 has retained connectivity to the external network device 20, as determined at decision block 86. If neither the primary NIC 14 nor the secondary NICs 16 and 18 retain connectivity to the external network device 20, the intermediate driver 30 may proceed to test for other secondary external network devices that may be designated on the network 12 to identify network segments with which connectivity is desired. In this manner, a hierarchy of external network devices may be tested for connectivity with members of the NIC team 24 until some network segment of interest is found to be connected to a member of the NIC team.

However, if one or more of the secondary NICs 16 and 18 has retained connectivity to the primary external network device 20, one of the secondary NICs 16 and 18 that remains coupled is designated as the new primary NIC and the primary NIC 14 is redesignated as a secondary NIC, as shown at block 88. The designation of the new primary NIC may be based upon a preconfigured order of the secondary NICs 16 and 18, such as based on bandwidth or expansion slot order, may be based upon a situational variable, such as the order of response from the external network device 20, or may be arbitrary. Typically the designation of the new primary NIC may be performed automatically by the operation of the intermediate driver 30, however, other drivers or software may also be configured to perform the designation. Alternatively, an operator may perform the resignation via the configuration application 36.

Once a new primary NIC is designated, the cycle of testing between the members of the NIC team 24 and the external network device 20 may be resumed. In some cases one or more of the members of the NIC team 24 may be preferred as the primary NIC 14, such as for bandwidth or reliability reasons. If one or more members of the NIC team 24 is preferred as the primary NIC 14, the reestablishment of connectivity between a preferred NIC and the external network device 20 may result in another redesignation event if a non-preferred NIC was designated as primary due to a connectivity break 72. In the absence of such a NIC hierarchy or redesignation scheme, however, the new primary NIC will continue as primary until reconfigured by an operator or by the occurrence of a new connectivity break 72.

While a new primary NIC may be designated in response to the connectivity test, other actions may also be desirable. For example, in the event that the one or more members of the NIC team 24 do not have connectivity to the external network device 20, an administrator may be notified of these connectivity failures, as shown at block 90. Similarly, the absence of connectivity between a NIC and the external network device 20 may result in the NIC being flagged or otherwise designated, such as in a table or other memory location accessible by the intermediate driver 30, as not having connectivity, as shown at block 92. Depending on the mode of operation of the NIC team 24, such designations may result in rebalancing the network traffic handled by the members of the NIC team 24, as shown at block 94, so that NIC team members with no connectivity are not used. Once connectivity is restored between a member of the NIC team 24 and the external network device 20, the flag or failure designation may be cleared and the member may be made available once again for load balancing or other functions.

Figure 5:
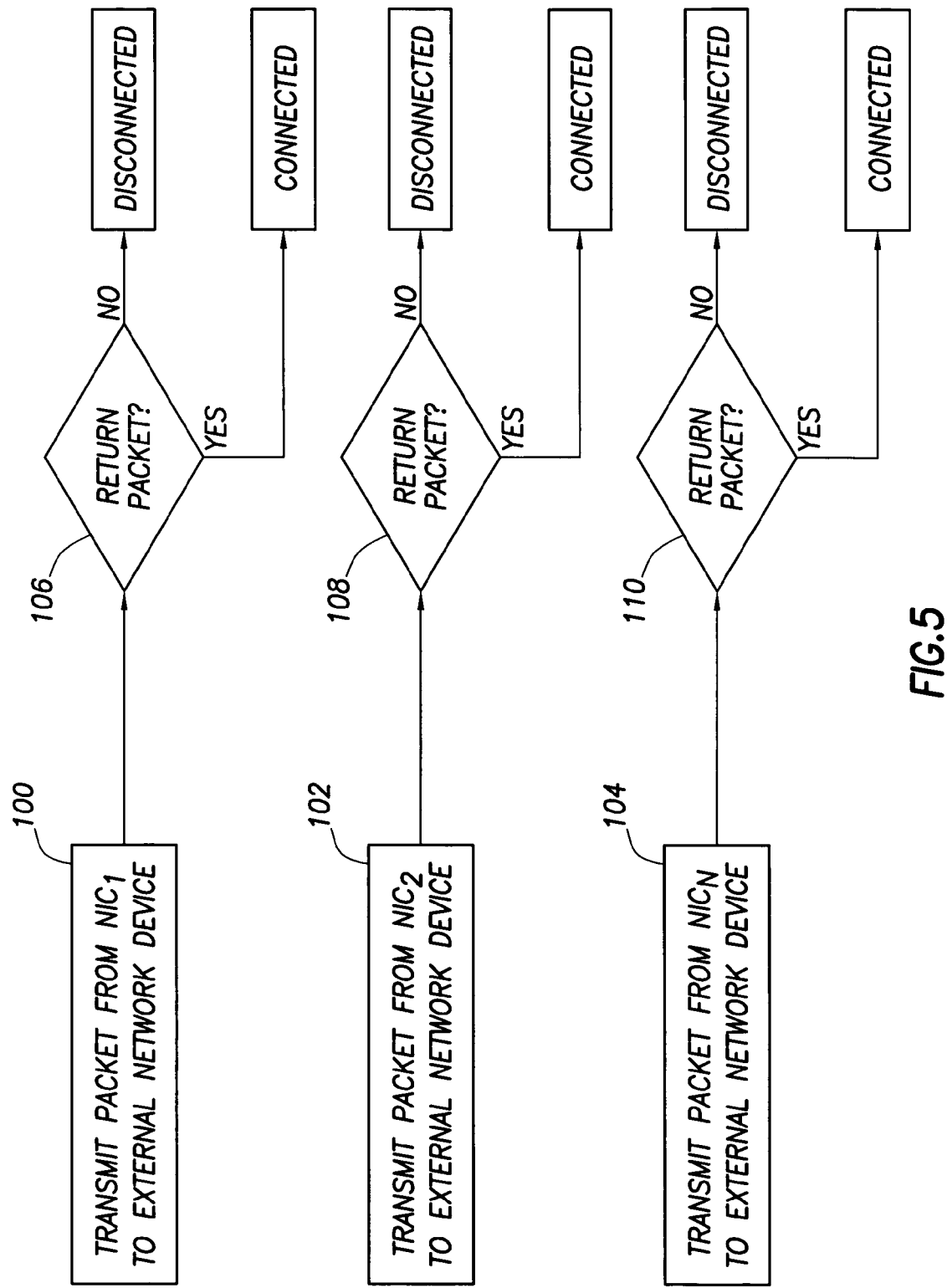
FIG. 5 illustrates a flow diagram of a technique for verifying connectivity between components in the system of FIG. 1, in accordance with an embodiment of the invention.

The preceding discussion presumes the ability to test the connectivity between the members of the NIC team 24 and the external network device 20. Referring now to FIG. 5, one technique for testing connectivity is described in detail. As shown, each NIC 14, 16, and 18 of the NIC team 24 periodically transmits a request packet to the external network device 20, as shown at blocks 100, 102, and 104. If the external network device 20 returns a response packet to the respective transmitting NIC, as determined at respective decision blocks 106, 108, and 110, the determination is made that the NIC couples to the external network device 20. Failure to receive a response packet at the transmitting NIC is indicative of a lack of connectivity between the respective NIC and the external network device 20. The response packet is addressed to the MAC address of the transmitting NIC, since packets directed to the IP address of the NIC team 24 are undesirably sent to the MAC address for the team, and thereby to the primary NIC 14, which may or may not be the transmitting NIC.

To direct response packets to the NIC transmitting the layer 3 heartbeat, a common packet format may be utilized. For example, the request packet may be based, possibly with some modification, on the address resolution protocol (ARP) format, which is typically used to determine MAC addresses from IP addresses. For example, the layer 3 heartbeat transmitted by a NIC to the external network device 20, i.e., the request packet, may resemble an ARP request frame without an IP address for the transmitting NIC (NIC team members do not have individual IP addresses but do have individual MAC addresses). Because the request packet does not include an IP address for the transmitter, the external network device 20 will respond to the MAC address associated with the transmitting NIC, thereby circumventing the NIC designated as primary when appropriate. For example, an ARP request packet transmitted from a NIC (designated "A" for this example) to a node (designated "B") may be formatted:

| Layer 2 | | | Layer 3 | | |
|---|---|---|---|---|---|
| Destination MAC = B | Source MAC = A | Destination MAC = B | Destination IP = .2 | Source MAC = A | Source IP = [Blank] |

The ARP response packet from the node to the NIC would then be formatted:

| Layer 2 | | | Layer 3 | | |
|---|---|---|---|---|---|
| Destination MAC = A | Source MAC = B | Destination MAC = A | Destination IP = [Blank] | Source MAC = B | Source IP = .2 |

One benefit of using an ARP request frame modified in this manner is that it will provoke a suitable response from any external network device 20 running TCP/IP, i.e., it is not necessary to modify the external network device 20 or provide special software or drivers. The MAC address and IP address used to generate the request packets to the external network device 20 may be provided via the configuration application 36 of FIG. 1. In such an implementation, an operator or administrator may determine the external network device 20 that should retain network connectivity and provides the appropriate IP and MAC addresses for this device to the intermediate driver 30 via the configuration application 36.

Other packet formats also may be used to verify connectivity between the external network device 20 and NICs in the NIC team 24. In at least some embodiments, a request packet sent from a NIC 14, 16 or 18 to the external network device 20 may resemble an ARP request frame but may have a "community IP address" in place of the IP address of the transmitting NIC and a "community MAC address" in place of the MAC address of the transmitting NIC.

The community IP address comprises an IP address selected and programmed (e.g., by an end-user) into the intermediate layer 30 which controls the NIC team 24. In at least some embodiments, the community IP address is arbitrarily selected by the end-user. In at least some embodiments, the community IP address does not match IP addresses assigned to any of the NICs 14, 16, or 18, the NIC team 24, or other devices in the system 12. Likewise, the community MAC address comprises a MAC address selected as desired by the end-user and programmed into the intermediate layer 30 by the end-user. In various embodiments, the community MAC address does not match MAC addresses assigned to any of the NICs 14, 16, or 18, the NIC team 24, or other devices in the system 12.

By assigning a community IP address to the NIC team 24, the NIC team 24 is assigned two IP addresses: a community IP address used specifically for testing connectivity between the external network device 20 and NICs in the NIC team 24, and an IP address used for transmitting and receiving other types of data to and from various components in the system 12 or coupled to the system 12. Similarly, the NIC team 24 is assigned two MAC addresses: a community MAC address used specifically for testing connectivity between the device 20 and NICs in the NIC team 24, and a MAC address used for transmitting and receiving other types of data to and from various components in the system 12.

Referring to FIG. 2, the use of the community IP and MAC addresses is now illustrated. Assume the NIC team 24 is assigned an IP address of 1.1 and a MAC address of "A." Also assume the NIC team 24 is assigned a community IP address of 1.2 and a community MAC address of "B." Further assume the external network device 20 is assigned an IP address of 1.3 and a MAC address of "C." In such a case, a request packet transmitted from a NIC in the NIC team 24 to the external network device 20 may be formatted:

| Layer 2 | | | Layer 3 | | |
|---|---|---|---|---|---|
| Destination MAC = C | Source MAC = A | Destination MAC = [Blank] | Destination IP = 1.3 | Source MAC = B | Source IP = 1.2 |

The layer 2 destination MAC field is assigned the MAC address "C" and the layer 2 source MAC field is assigned the MAC address "A," since the request packet is being transmitted from the NIC team 24 to the external network device 20. The layer 3 destination MAC address field is left blank (i.e., NULL), since this is the information being requested by the NIC team 24 from the external network device 20. The layer 3 destination IP field is assigned the IP address 1.3 because the IP address of the external memory device 20 is 1.3. In accordance with embodiments of the invention, although the request packet is being sent by a NIC in the NIC team 24, and although the NIC team 24 has a source MAC address of "A," the layer 3 source MAC field is assigned the MAC address "B" (i.e., the community MAC address). Likewise, although the IP address of the NIC team 24 is 1.1, the layer 3 source IP field is assigned the IP address of 1.2 (i.e., the community IP address). The community IP and MAC addresses are included in the request packet in this way for reasons described further below.

En route to the external network device 20, the request packet passes through a switch (e.g., one of the switches 56, 58, or 59). The switch comprises a MAC table which cross-references the MAC addresses of various components in the system 12 with the switch ports to which the components couple. For example, the MAC table of switch 58 may contain an entry which cross-references the MAC address "C" with the switch port coupled to the external network device 20. When the switch receives the request packet, the switch compares the layer 2 destination MAC address "C" against the MAC table stored in the switch. Upon locating a matching entry, the switch outputs the request packet on the port coupled to the external network device 20. In at least some embodiments, the MAC table is updated when a data packet (e.g., a request packet or response packet) passes through the switch.

The external network device 20 receives the request packet from the switch and responds by sending a response packet. Before transmitting the response packet, the device 20 may extract and record data from the request packet. For example, the device 20 may comprise an ARP table which cross-references MAC addresses of various devices in the system 12 with their corresponding IP addresses. Thus, upon receiving the request packet shown above, the device 20 may record an entry in its ARP table which cross-references the community IP address 1.2 with the community MAC address of "B."

After extracting and recording data from the request packet, the external network device 20 generates and sends a response packet to the NIC team 24. The response packet may be formatted:

| Layer 2 | | Layer 3 | | | |
|---|---|---|---|---|---|
| Destination MAC = B | Source MAC = C | Destination MAC = B | Destination IP = 1.2 | Source MAC = C | Source IP = 1.3 |

The layer 2 destination MAC field is assigned the MAC address "B" (i.e., the community MAC address) and the source MAC field is assigned the MAC address "C," since the response packet is being sent from the external network device 20 to the NIC team 24. The layer 3 destination MAC field is assigned the community MAC address "B." The layer 3 destination IP field is assigned the community IP address 1.2. The layer 3 source MAC field is assigned the MAC address "C" and the source IP field is assigned the IP address 1.3, since the response packet is being transmitted by the device 20.

Depending on how the external network device 20 is configured, the device 20 may send the response packet to the NIC team 24 via one or more of the switches 56, 58 and/or 59. Upon receiving the response packet, a switch checks the layer 3 destination MAC address (i.e., community MAC address) against the MAC table to locate a corresponding entry in the MAC table. Because the community MAC address "B" is not assigned to the layer 2 source MAC field in request or response packets, the community MAC address is not recorded in the MAC table. Thus, the switch is unable to find a match in the MAC table which corresponds to the community MAC address. Accordingly, instead of sending the response packet from the device 20 to a specific NIC, the switch sends copies of the response packet out on some or all of the ports coupled to the switch. In this way, each NIC coupled to the switch receives a response packet from the external network device 20. Upon receiving a response packet, each NIC in the NIC team 24 transfers the response packet to the intermediate layer 30. Once the intermediate layer 30 determines that the response packet received by a particular NIC is from the external network device 20, connectivity between that NIC and the external network device 20 is verified.

Formats besides the ARP format, e.g., the Internet Control Message Protocol (ICMP) format, also may be used in request and response packets to verify connectivity between the external network device 20 and NICs in the NIC team 24. In at least some embodiments, a request packet sent from a NIC 14, 16 or 18 to the external network device 20 may resemble an Internet Control Message Protocol (ICMP) request frame, but may include a community IP address in place of the ICMP source IP. Continuing with the example above in which the NIC team 24 is assigned an IP address of 1.1, a MAC address of "A," a community IP address of 1.2 and a community MAC address of "B," and the external network device 20 is assigned an IP address of 1.3 and a MAC address of "C," a request packet transmitted from a NIC in the NIC team 24 to the external network device 20 may be formatted:

| ICMP Request Packet | | | |
|---|---|---|---|
| Source MAC = A | Destination MAC = C | Source IP = 1.2 | Destination IP = 1.3 |

The source MAC field is assigned the source MAC address "A," since the ICMP request packet is being transferred from a NIC in the NIC team 24. The destination MAC field is assigned the destination MAC address "C," since the ICMP packet is being transferred to the external network device 20. The source IP field is assigned the source IP address 1.2, since the community IP address is 1.2. The destination IP field is assigned the destination IP address of 1.3, since the external network device 20 has an IP address of 1.3. In at least some embodiments, an end-user programs the destination MAC address, the destination IP address and the source IP address into the intermediate layer 30 such that the intermediate layer 30 may generate an ICMP request packet such as that shown above.

En route to the external network device 20, the request packet passes through one or more switches (e.g., switches 56, 58 or 59). A switch compares the destination MAC address in the request packet against the MAC table stored in the switch to determine to which switch port the device 20 couples. The switch then sends the request packet to the external network device 20 via the appropriate switch port.

The external network device 20 receives the request packet and may extract and record data from the request packet. For example, the device 20 may record data for entry into the ARP table stored on the device 20. In at least some embodiments, the ARP table is programmed (e.g., by an end-user) with an entry which cross-references the community MAC address "B" of the NIC team 24 with the community IP address of 1.2. Accordingly, the device 20 compares the community IP address stored in the request packet against the ARP table and determines that the community MAC address is "B." The device 20 uses this information to generate an ICMP response packet which may be formatted:

| ICMP Response Packet | | | |
|---|---|---|---|
| Source MAC = C | Destination MAC = B | Source IP = 1.3 | Destination IP = 1.2 |

The ICMP response packet comprises a source MAC field assigned to the source MAC address of "C," since the response packet is being transmitted by the external network device 20. The destination MAC field is assigned a destination MAC address "B," which is the community MAC address of the NIC team 24 as obtained from the ARP table stored on the device 20. The source IP field is assigned to a source IP address 1.3, since the device 20 has an IP address of 1.3. The destination IP field is assigned a destination IP address of 1.2, since the community IP address of the NIC team 24 is 1.2. After generating the response packet, the device 20 sends the packet to one or more switches in the system 12.

Upon receiving the response packet, a switch in the system 12 compares the destination MAC address against entries in the MAC table stored on the switch to determine the switch port via which the response packet should be output. Because the community MAC address "B" is not assigned to the source MAC field of request or response packets, it is not recorded in the MAC table, and thus the switch is unable to locate an entry in the MAC table corresponding to the community MAC address. Accordingly, the switch outputs copies of the response packet on some or all of the switch ports. In this way, NICs coupled to the switch receive copies of the response packet. Each NIC which receives a copy of the response packet transfers the response packet to the intermediate layer 30. Once the intermediate layer 30 determines that a packet received by a particular NIC is from the external network device 20, connectivity between that NIC and the device 20 is verified.

Figure 7:
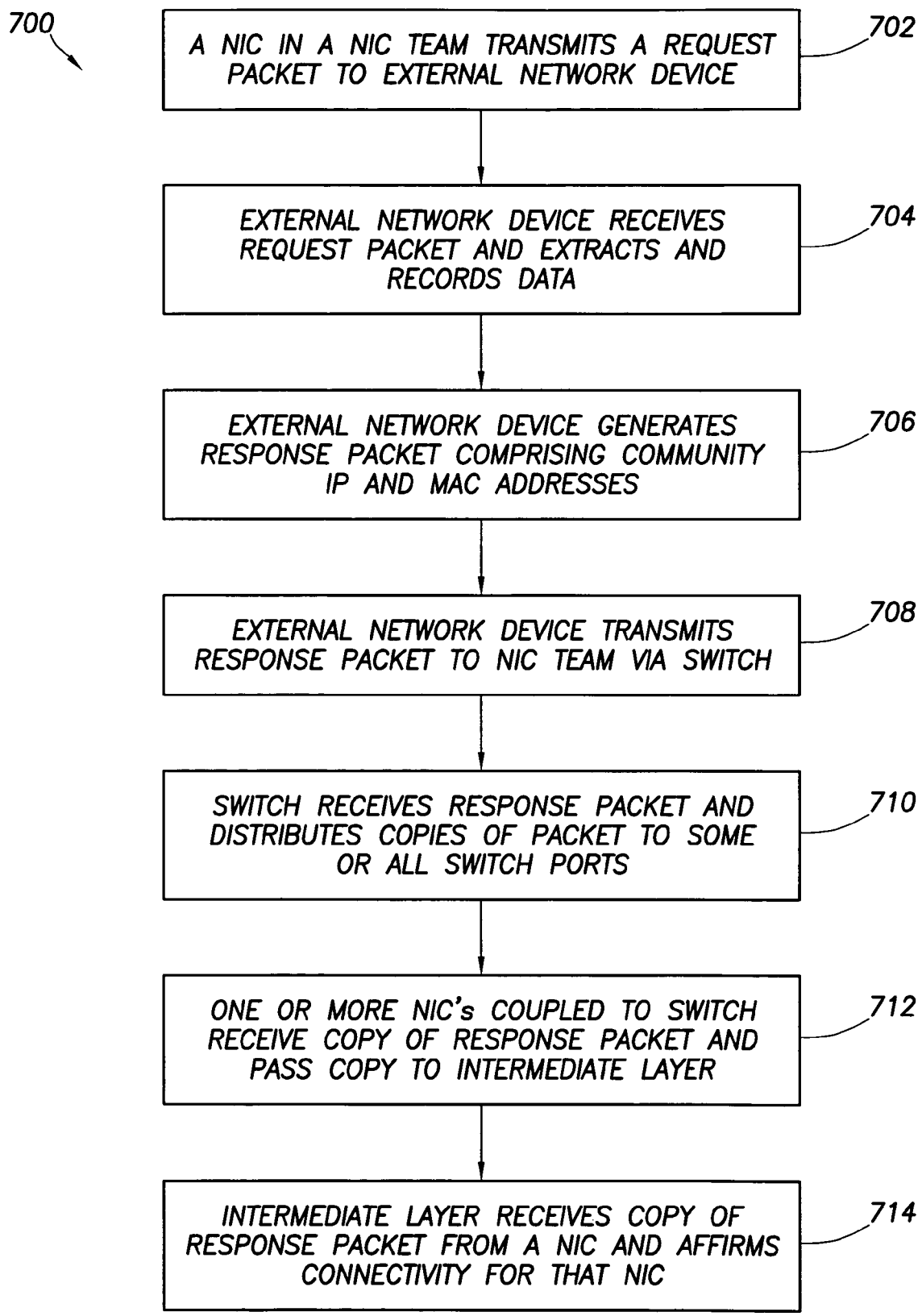
FIG. 7 illustrates a flow diagram of another technique for verifying connectivity between components in the system of FIG. 2, in accordance with another embodiment of the invention.

FIG. 7 shows a flow diagram of a method 700 associated with the two immediately preceding connection verification techniques. The method 700 begins by transmitting a request packet from a NIC in a NIC team to an external network device (block 702). En route to the external network device, the request packet may pass through various system components (e.g., switches). The request packet may be of any of a variety of formats, such as the ARP format or the ICMP format. The request packet may contain the community IP and MAC addresses associated with the NIC team. In some embodiments, these community IP and MAC addresses may be pre-programmed (e.g., by an end-user) into a server housing the NIC team. In other embodiments, the community IP and MAC addresses may be sent to the server from a different component via a network connection. The method 700 continues with the external network device receiving the request packet, whereupon the external network device may extract and record data (e.g., IP and/or MAC addresses) stored in the packet (block 704). The extracted data may be stored, for instance, in an ARP table stored on the external network device. The method 700 continues with the external network device generating a response packet comprising the community IP and community MAC addresses (block 706). In at least some embodiments, the community IP and MAC addresses may be obtained from the request packet sent by the NIC mentioned above.

The method 700 continues with the external network device transmitting the response packet to one or more switches between the external network device and the NIC team mentioned above (block 708). In at least some embodiments, each switch coupled to the external network device receives the response packet. Each switch, upon receiving the response packet, attempts to route the response packet to the appropriate switch port based on the community MAC address stored on the response packet. In at least some embodiments, the switch may use a MAC table stored on the switch to determine which switch port corresponds to the community MAC address. Because an entry containing the community MAC address is not found in the MAC table, the switch may distribute a copy of the response packet to some or all of the switch ports (block 710).

The method 700 continues with one or more NICs coupled to the switch receiving a copy of the response packet and passing the copy of the response packet to a teaming driver (e.g., an intermediate layer driver) operating on the server comprising the NIC (block 712). Upon receiving a copy of the response packet from a particular NIC, the teaming driver affirms connectivity with the external network device for that NIC (block 714). For example, the teaming driver may affirm connectivity by adjusting the status of a bit dedicated to that NIC and stored in memory (not specifically shown) on the server 50.

A combination of ARP frames and ICMP frames also may be used to verify connectivity between the external network device 20 and NICs in the NIC team 24. In at least some embodiments, a request packet sent from a NIC 14, 16 or 18 to the external network device 20 may resemble an ICMP frame but may include a community IP address in place of the ICMP source IP. Continuing with the example above in which the NIC team 24 is assigned an IP address of 1.1, a MAC address of "A," a community IP address of 1.2 and a community MAC address of "B," and the external network device 20 is assigned an IP address of 1.3 and a MAC address of "C," an ICMP request packet transmitted from a NIC in the NIC team 24 to the external network device 20 may be formatted:

| ICMP Request Packet | | | |
|---|---|---|---|
| Source MAC = A | Destination MAC = C | Source IP = 1.2 | Destination IP = 1.3 |

The source MAC field is assigned the source MAC address "A," since the ICMP packet is being transferred from a NIC in the NIC team 24. The destination MAC field is assigned the destination MAC address "C," since the ICMP packet is being transferred to the external network device 20. The source IP field is assigned the source IP address 1.2, since the community IP address is 1.2. The destination IP field is assigned the destination IP address of 1.3, since the external network device 20 has an IP address of 1.3. In at least some embodiments, an end-user programs the destination MAC address, the destination IP address and the source IP address into the intermediate layer 30 such that the intermediate layer 30 may generate an ICMP request packet similar to that shown above.

En route to the external network device 20, the request packet passes through one or more of the switches (e.g., switches 56, 58 or 59). The switch compares the destination MAC address in the request packet against the MAC table stored in the switch to determine to which switch port the device 20 couples. The switch then sends the request packet to the external network device 20 via the appropriate switch port.

The external network device 20 receives the request packet and may extract and record data from the request packet. For example, the device 20 may record data for entry into the ARP table stored on the device 20. In at least some embodiments, the ARP table does not contain an entry which cross-references the community MAC address of the NIC team 24 with the community IP address of 1.2. Accordingly, the device 20 compares the community IP address stored in the request packet against the ARP table and determines that there is no entry in the ARP table corresponding to the community IP address 1.2. Accordingly, instead of sending an ICMP response packet to the NIC team 24, the device 20 instead sends a request packet (i.e., an ARP request frame) to the NIC team 24 requesting the MAC address of the NIC team 24. The device 20 sends this request packet because in order for it to respond to the ICMP request packet sent by the NIC team 24, the device 20 first needs the MAC address for the NIC team 24. The ARP request packet generated by the device 20 may be formatted:

| Layer 2 | | | Layer 3 | | |
|---|---|---|---|---|---|
| Destination MAC = B | Source MAC = C | Destination MAC = [Blank] | Destination IP = 1.2 | Source MAC = C | Source IP = 1.3 |

The Layer 2 destination MAC field is "B," since the destination MAC address has a MAC address "B." The Layer 2 source MAC field is assigned to the source MAC address "C,"

since the MAC address of the device 20 is "C." The Layer 3 destination MAC field is blank, since the destination MAC address (i.e., the community MAC address of the NIC team 24) is unknown. The Layer 3 destination IP address is 1.2, since the NIC team 24 has a community IP address of 1.2. The Layer 3 source MAC and source IP fields are "C" and 1.3, respectively, since the device 20 has a MAC address of "C" and an IP address of 1.3. The device 20 sends the ARP request packet to one or more switches in the system 12.

Upon receiving the ARP request packet, a switch in the system 12 compares the destination MAC address "B" against entries in the MAC table stored on the switch to determine the switch port to which the request packet should be output. Because the destination MAC address is not provided in the ARP request packet, the switch outputs copies of the request packet on some or all of the switch ports. In this way, NICs coupled to the switch receive copies of the request packet. Each NIC which receives a copy of the request packet transfers the request packet to the intermediate layer 30. Once the intermediate layer 30 determines that a packet received by a particular NIC is from the external network device 20, connectivity between that NIC and the device 20 is verified. After connectivity is verified, the NIC team 24 may optionally respond to the ARP request packet with a response packet including the community MAC address of the NIC team 24 so that the external network device 20 may update its ARP table as necessary.

Figure 8:
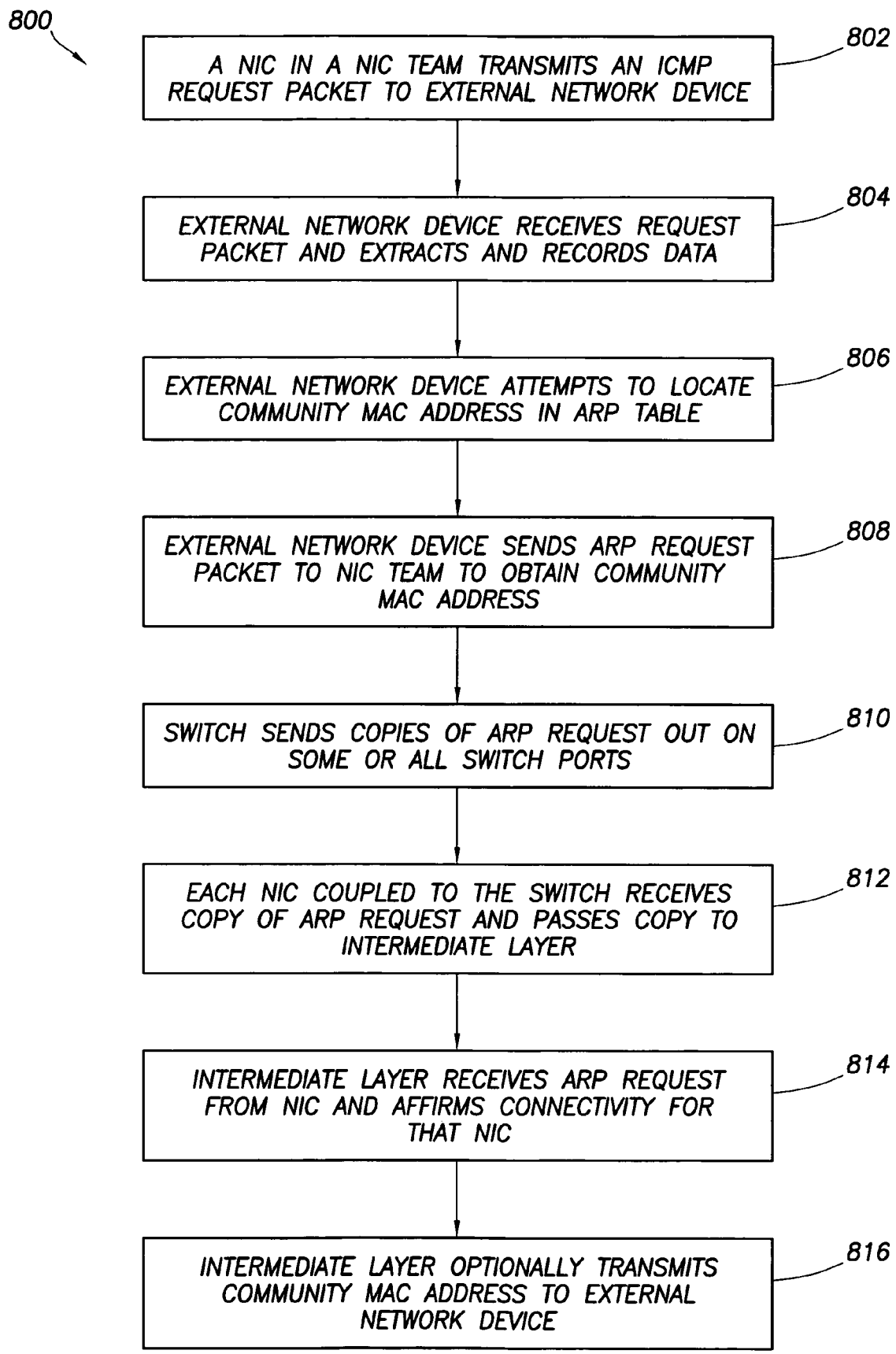
FIG. 8 illustrates a flow diagram of yet another technique for verifying connectivity between components in the system of FIG. 2, in accordance with another embodiment of the invention.

FIG. 8 shows a flow diagram of a method 800 associated with the immediately preceding connection verification technique. The method 800 begins by transmitting a request packet, such as an ICMP request packet, from a NIC in a NIC team to the external network device (block 802). The method 800 continues with the external network device receiving the request packet (block 804). The external network device may extract data, such as IP and MAC addresses, from the request packet and record the data (e.g., to an ARP table stored on the external network device). The method 800 continues with the external network device attempting to locate an entry in the ARP table which corresponds to the community MAC address in the request packet (block 806). Because the community MAC address is not programmed into the ARP table, the method 800 continues with the external network device sending a request packet (e.g., an ARP request packet) to the NIC team to obtain the community MAC address (block 808).

En route to the NIC team, the ARP request packet may pass through one or more switches. Because the ARP request packet does not contain a destination MAC address at the layer 3 level (i.e., a community MAC address), the switch is unable to select a specific switch port on which to output the ARP request packet. Accordingly, the method 800 continues with the switch transmitting copies of the ARP request packet on some or all of the switch ports (block 810). Each NIC coupled to the switch receives a copy of the ARP request packet, and the method 800 continues with each NIC passing the copy of the ARP request packet to a teaming driver (e.g., an intermediate layer driver executing on a server housing the NIC) as shown at block 812.

Upon receiving the copy of the ARP request packet from a particular NIC, the method 800 continues with the teaming driver affirming connectivity between the external network device and that NIC (block 814), e.g., by adjusting a bit stored on the server 50. The method 800 also comprises optionally transmitting the community MAC address from the teaming driver to. the external network device in the form of an ARP response packet (block 816).

The scope of disclosure encompasses variations and modifications of the above technique. For example, in at least some embodiments, each NIC team in each server in the system 12 is assigned the same community IP address and the same community MAC address. In this way, a single packet generated and sent by the external network device 20 is copied and sent to each NIC team in each server in the system 12 by one or more switches in the system 12. Moreover, the above techniques may be used to confirm connectivity with more than one external network device at a time.

Figure 6:
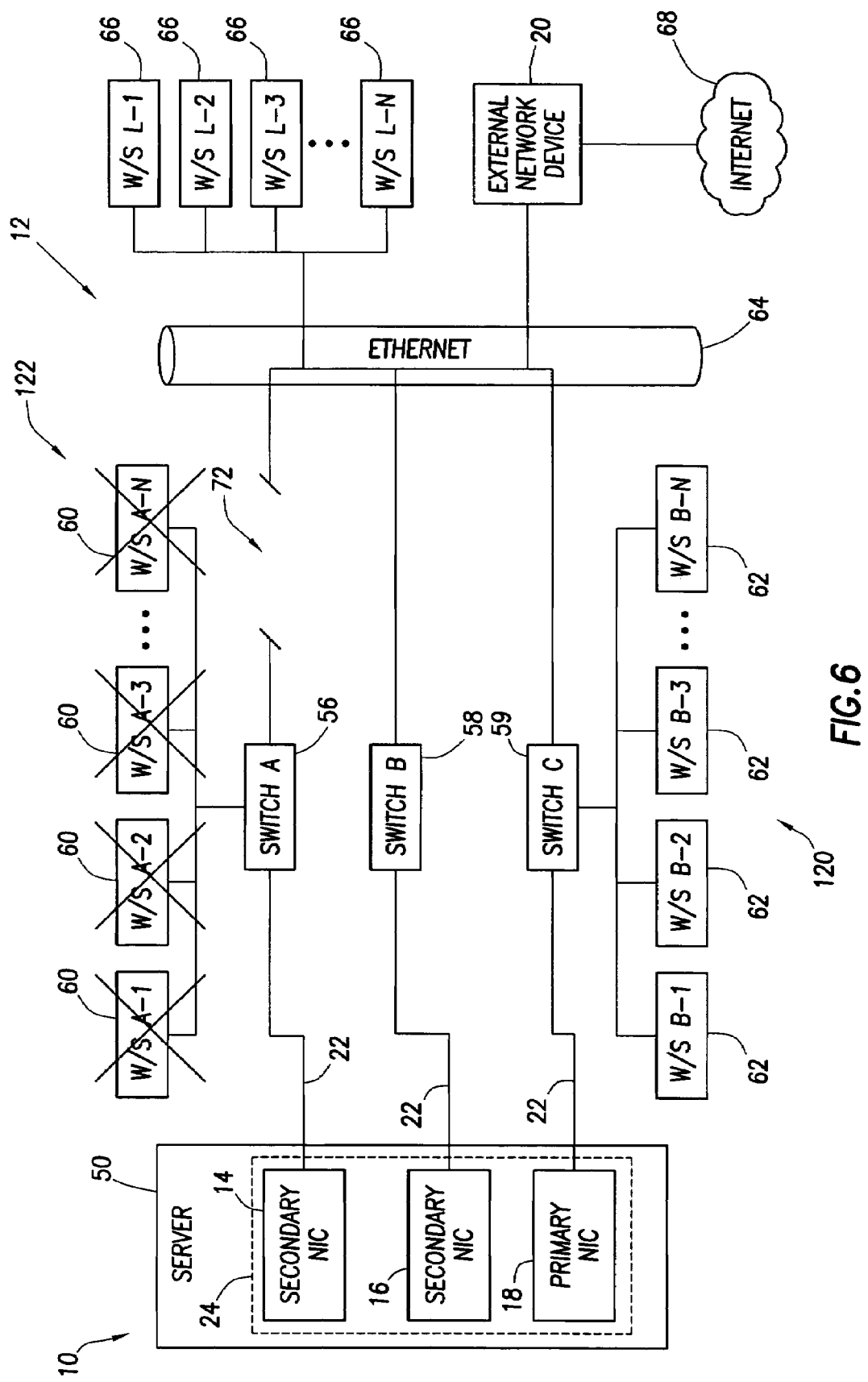
FIG. 6 shows a block diagram of the illustrative computer network of FIG. 2 undergoing a connection disruption and partial recovery, in accordance with an embodiment of the invention.

As a result of the connectivity testing and response processes described above, a new active network segment 120 may result, which couples to the new primary NIC 18 and includes the external network device 20, as shown in FIG. 6. Conversely, a new inactive network segment 122 coupled to the new secondary NIC 14 (which was formerly designated as the primary NIC) is also created. In this manner, connectivity to the NIC team 24 is restored for that network segment which includes the external network device 20, though connectivity between the server 50 and other network segments may be sacrificed. If the present techniques are implemented automatically, such as by the intermediate driver 30, manual reconfiguration of the NIC team 24 by an administrator may be circumvented, allowing rapid recovery of desired network functionality.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a computer comprising a plurality of network interface controllers (NICs), said plurality of NICs associated with an address;
   a switching apparatus coupled to the computer; and
   an echo device coupled to the switching apparatus, wherein said echo device receives a request originated by one of said NICs, said request provided to said echo device to verify connectivity of said NICs and said request including a layer 2 source address and a second source address encapsulated using a layer 3 protocol, wherein the layer 2 source address and the second source address are different from each other, and wherein said echo device is adapted to send a response packet through the switching apparatus to verify connectivity with the plurality of NICs, said response packet having as a layer 2 destination address the second source address from the request;
   wherein the switching apparatus compares the layer 2 destination address of the response packet with a data structure to locate a matching address; and
   wherein, if no matching address is located, the switching apparatus sends copies of the response packet to each of the plurality of NICs coupled to the switching apparatus;
   wherein one of the plurality of NICs is designated as a primary NIC based upon the receipt of copies of the response packet by at least some of the plurality of NICs; and
   wherein the request's second source address comprises a media access control (MAC) address not stored in the data structure of the switching apparatus.

2. The system of claim 1, wherein the request packet further comprises an internet protocol (IP) address associated with the plurality of NICs, and wherein said echo device further comprises a second data structure which cross-references said IP address with said address.

3. A computer, comprising:

a plurality of NICs capable of coupling to a network device via a switching apparatus;

wherein one of the plurality of NICs sends a request packet to the network device to verify connectivity with said device, said request packet containing a layer 2 source address and a second source address encapsulated using a layer 3 protocol, wherein the layer 2 source address and the second source address are different from each other;

wherein the plurality of NICs receive copies of a response packet received by the switching apparatus in response to the request packet if the response packet has a destination address not stored in a data structure of the switching apparatus, wherein said second source address is designated as a destination address in the response packet;

wherein both the layer 2 source address and the second source address are MAC addresses associated with the plurality of NICs.

4. The computer of claim 3, wherein the computer designates one of the plurality of NICs as a primary NIC based upon the receipt of respective copies of the response packet by the plurality of NICs.

5. The computer of claim 3, wherein the computer provides notification that at least one of the plurality of NICs is not coupled to the network device.

6. A method for verifying connectivity, comprising:

at a computer comprising a plurality of NICs coupled to a switching apparatus, sending a request packet containing a layer 2 source address and a second source address encapsulated using a layer 3 protocol, wherein said layer 2 source address and said second source address are different;

at the switching apparatus, receiving a response packet comprising said second source address from the request packet as a layer 2 destination address in the response packet;

comparing said layer 2 destination address against a data structure comprising a plurality of addresses to locate a match;

if no match is located, sending copies of the packet to each of the plurality of NICs coupled to the switching apparatus; and at a computer comprising plurality of NICs, designating one of the plurality of NICs as a primary NIC based upon the receipt of respective copies of the packet by each of the plurality of NICs.

7. The method of claim 6, further comprising reconfiguring the plurality of NICs such that the primary NIC is coupled to a network device used to generate said response packet.

8. A system, comprising:

a computer comprising a plurality of network interface controllers (NICs) connected to a switching apparatus and a network device:

means for generating a request packet at said computer to verify the connectivity of the network device with the plurality of NICs, said request packet comprising a layer 2 source address and a second source address encapsulated using a layer 3 protocol, wherein said layer 2 source address and said second source address are different from each other;

means for, at said switching apparatus, receiving a response packet containing said second source address from the request packet as a layer 2 destination address and comparing the layer 2 destination address with a data structure to locate a matching address;

wherein the means for comparing is also for sending copies of the packet to each of the plurality of NICs coupled to the means for comparing if no match is located.

* * * * *

UNITED STATES PATENT AND TRADEMARK OFFICE
CERTIFICATE OF CORRECTION

PATENT NO. : 7,693,045 B2 Page 1 of 1
APPLICATION NO. : 11/315812
DATED : April 6, 2010
INVENTOR(S) : Michael Sean McGee et al.

It is certified that error appears in the above-identified patent and that said Letters Patent is hereby corrected as shown below:

In column 16, line 21, in Claim 8, delete "device:" and insert -- device; --, therefor.

Signed and Sealed this

Twentieth Day of July, 2010

David J. Kappos
*Director of the United States Patent and Trademark Office*